United States Patent [19]
West et al.

[11] Patent Number: 5,264,950
[45] Date of Patent: Nov. 23, 1993

[54] LIGHT MODULATING DEVICE WITH POLARIZER AND LIQUID CRYSTAL INTERSPERSED AS SPHERICAL OR RANDOMLY DISTORTED DROPLETS IN ISOTROPIC POLYMER

[75] Inventors: John West, Stow; J. Craig Carrell, Akron, both of Ohio

[73] Assignee: Kent State University, Kent, Ohio

[21] Appl. No.: 818,720

[22] Filed: Jan. 6, 1992

[51] Int. Cl.$^5$ .................... G02F 1/13; G02F 1/1335
[52] U.S. Cl. .................................. 359/51; 359/63
[58] Field of Search .............................. 359/51, 52, 63

[56] References Cited

U.S. PATENT DOCUMENTS

| | | | |
|---|---|---|---|
| 4,048,358 | 9/1977 | Shanks | 359/64 |
| 4,068,926 | 1/1978 | Nakamura et al. | 359/64 |
| 4,385,806 | 5/1983 | Fergason | 359/39 |
| 4,418,102 | 11/1983 | Ferrato | 359/80 |
| 4,556,289 | 12/1985 | Fergason | 359/52 |
| 4,671,618 | 6/1987 | Wu et al. | 359/52 |
| 4,673,255 | 6/1987 | West et al. | 359/51 |
| 4,688,900 | 8/1987 | Doane et al. | 359/52 |
| 4,749,261 | 6/1988 | McLaughlin et al. | 359/51 |
| 4,848,875 | 7/1989 | Baughman et al. | 359/52 |
| 4,890,902 | 1/1990 | Doane et al. | 359/52 |
| 4,899,503 | 2/1990 | Baughman et al. | 359/53 |
| 5,113,270 | 5/1992 | Fergason | 359/52 |
| 5,156,452 | 10/1992 | Drzaic et al. | 359/51 |

FOREIGN PATENT DOCUMENTS

| | | | |
|---|---|---|---|
| 55-96922 | 7/1980 | Japan . | |
| 1540878 | 2/1979 | United Kingdom . | |
| 8504262 | 9/1985 | World Int. Prop. O. | 359/52 |

OTHER PUBLICATIONS

Fergason, J., "Polymer Encapsulated Nematic Liquid Crystals for Display and Light Control Applications," *SID 85 Digest*, pp. 68–70 (1985).

Wu et al., "Angular Discrimination of Light Transmission Through Polymer-dispersed Liquid-Crystal Films," *J. Appl. Phys.*, vol. 62, No. 9, 3925–3931 (Nov. 1987).

Drzaic, P., "Polymer Dispersed nematic Liquid Crystal For Large Displays and Light Valves," *J. Appl. Phys.*, vol. 60, No. 6, pp. 2142–2148 (Sep. 1986).

*Primary Examiner*—William L. Sikes
*Assistant Examiner*—Anita Pellman Gross
*Attorney, Agent, or Firm*—Watts, Hoffmann, Fisher & Heinke Co.

[57] ABSTRACT

The invention provides an improvement in light modulating devices employing birefringent liquid crystal interspersed in isotropic polymer. A polarizer disposed on a surface of the liquid crystal device produces haze-free viewing for all viewing angles in the plane orthogonal to the polarization direction of the light passed by the polarizer.

10 Claims, 2 Drawing Sheets

LIGHT MODULATING DEVICE WITH POLARIZER AND LIQUID CRYSTAL INTERSPERSED AS SPHERICAL OR RANDOMLY DISTORTED DROPLETS IN ISOTROPIC POLYMER

FIELD OF THE INVENTION

This invention relates generally to devices employing electrically switchable films and coatings comprised of liquid crystal and an isotropic polymer, and more particularly to improvements in direct view devices of the type described which provide for optimum haze-free light transmission in a selected plane of view.

BACKGROUND OF THE INVENTION

Electrically switchable liquid crystal-polymer films intended for use in various electro-optical devices have been prepared by mechanical entrapment procedures. One such technique involves imbibing liquid crystal into micropores of a plastic or glass sheet. Another technique involves evaporation of water from an aqueous emulsion of nematic liquid crystal in a solution of water-soluble isotropic polymer such as polyvinyl alcohol.

A different procedure offering significant advantages over mechanical entrapment techniques and the emulsification procedure involves phase separation of liquid crystal from a homogeneous solution with a suitable synthetic resin to form a liquid crystal phase dispersed with an isotropic polymer phase. Techniques of preparing such materials and their advantages are discussed in U.S. Pat. Nos. 4,671,618; 4,673,255; 4,685,771; 4,688,900 and 4,890,902, the disclosures of which are incorporated herein by reference.

The various methods of preparing electrically switchable films as disclosed in the forgoing patents are accompanied by techniques of matching and mismatching the effective index of refraction of the liquid crystal phase with the index of refraction of the polymer to achieve the desired viewing angle in which direct view displays, windows, etc. that incorporate the films may be made viewable or clear. In the case of films made with liquid crystal having positive dielectric anisotropy, the ordinary index of refraction of a liquid crystal typically is matched to the refractive index of the polymer so that in a field-ON state, the display or window appears visible or clear because the optical axes of refraction of the liquid crystal are aligned parallel to the field and normal to the viewing surface. In the field-OFF state, the optical axes of the liquid crystal and polymer are misaligned and randomly oriented so that incident light is scattered and the display or window appears opaque.

In windows or other direct view displays as described above in which the ordinary index of refraction of the liquid crystal is matched to the refractive index of the polymer, the device appears most transparent (field-ON state) when viewed along the direction of the field, which is usually normal to the viewing surface. Transparency decreases giving rise to increasing "haze" at increasing oblique viewing angles until an essentially opaque appearance is detected at an oblique enough angle. This condition of haze results from the fact that the farther the viewing angle is from the orthogonal, the greater is the mismatch between the effective index of refraction of the liquid crystal and the refractive index of the matrix.

SUMMARY OF THE INVENTION

The present invention overcomes the problem of viewing haze encountered with electrically switchable liquid crystal-isotropic polymer films having the ordinary index of refraction of the liquid crystal matched to the refractive index of the polymer, and is based on a recognition that such films scatter light of only one polarization when viewed off-axis. In accordance with the invention, a polarizer is combined with the liquid crystal film to make it haze-free for all angles of view within a selected viewing plane determined by the direction of polarization of the polarizer. The plane that is orthogonal to the polarization direction of the light passed by the polarizer will be the haze-free plane. In the case of a window or other direct view device, a vertical polarizer is used to produce haze-free viewing in a horizontal plane. Alternatively, a horizontal polarizer will produce haze-free viewing in a vertical plane.

The polarizer can be incorporated with the liquid crystal polymer film during its production or anytime thereafter. Once added, the polarizer has the effect of removing haze for an entire plane of view. Thus, the invention provides an inexpensive, practical way of producing haze-free windows and displays.

In accordance with the forgoing, the invention in the preferred form comprises a light modulating material including a birefringent liquid crystal isotropic polymer film and a polarizer which is effective to absorb or reflect one direction of polarization and thereby provide haze-free viewing through the device at all angles in a plane orthogonal to the polarization passed by the polarizer. If desired the light modulating material can include a second polarizer having a polarization direction parallel to that of the first mentioned polarizer wherein the film is interposed between the polarizers.

DETAILED DESCRIPTION OF THE INVENTION

Figure 1:
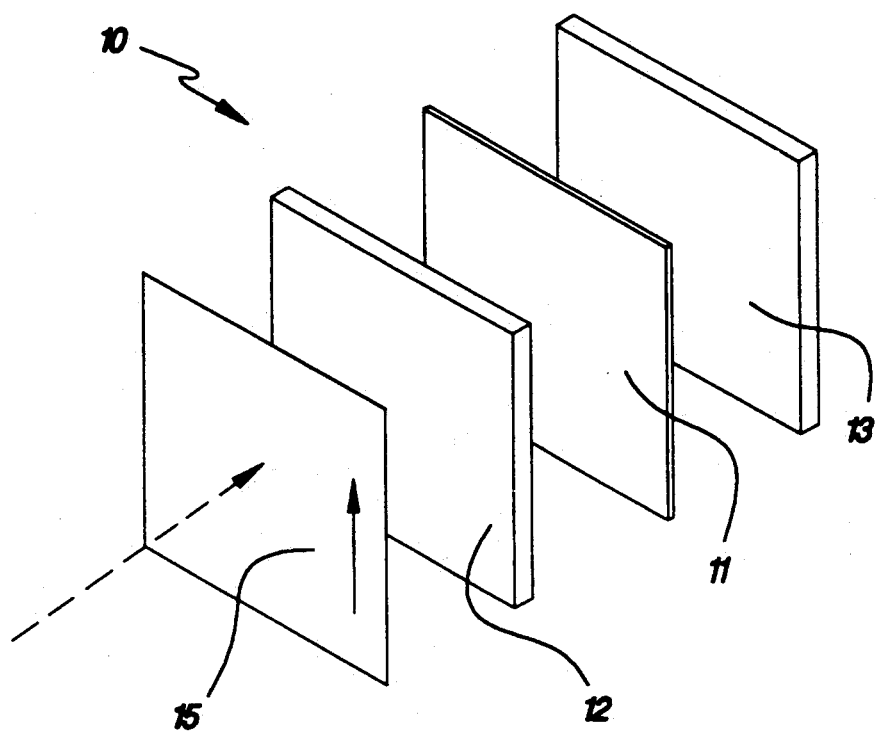
FIG. 1 is a diagrammatic exploded view of a light modulating device according to the invention.

In FIG. 1, the illustrated device 10 is shown to comprise light modulating film 11 between transparent non-birefringent substrates 12, 13. The film 11 is comprised principally of birefringent liquid crystal and isotropic polymer. A preferred film is disclosed in the above-referenced patents and is formed by phase dispersed liquid crystal droplets in a polymer matrix. Other suitable films are formed by liquid crystal imbibed in a polymer micropore and by encapsulated liquid crystal droplets in a matrix of polyvinyl alcohol or the like. In films of the type described, the ordinary index of refraction of the liquid crystal is typically matched as closely as possible to the refractive index of the isotropic polymer in order to achieve the desired light modulating or shuttering effect.

The inner surface of the substrates 12, 13 adjacent to the film 11 are provided with transparent electrode coatings (not shown) of indium-tin oxide or the like. An AC voltage source (also not shown) is connected to the electrodes in order to switch the device 10 between light scattering and light transmitting states. In a typical mode of operation, light is scattered in the field-off state because of the mismatch between the indices of refraction so that the device 10 is opaque. In the field-ON condition, the extraordinary index of refraction of the liquid crystal (the optical axis) is aligned normal to the substrates 12, 13 so that incident light is transmitted.

When the ordinary optical refractive index of the liquid crystal is matched to the refractive index of the polymer, the degree of light transmission through the film 11 in a field-ON state depends upon the effective value of the extraordinary refractive index of the droplet which varies with the polarization and angle Θ between the incident direction of light and the nematic directors of the liquid crystal droplets. In the field-ON condition, with the nematic directors normal to film 11, the film will exhibit maximum light transmissibility when the direction of incident light also is normal, since the angle Θ is zero and, hence, the effective refractive indices are substantially equal to the ordinary index for all polarizations. In the case of off-axis viewing in both the vertical and horizontal planes, the effective extraordinary index of refraction will increase with the angle theta which results in increasing light scattering or haze.

Figure 2:
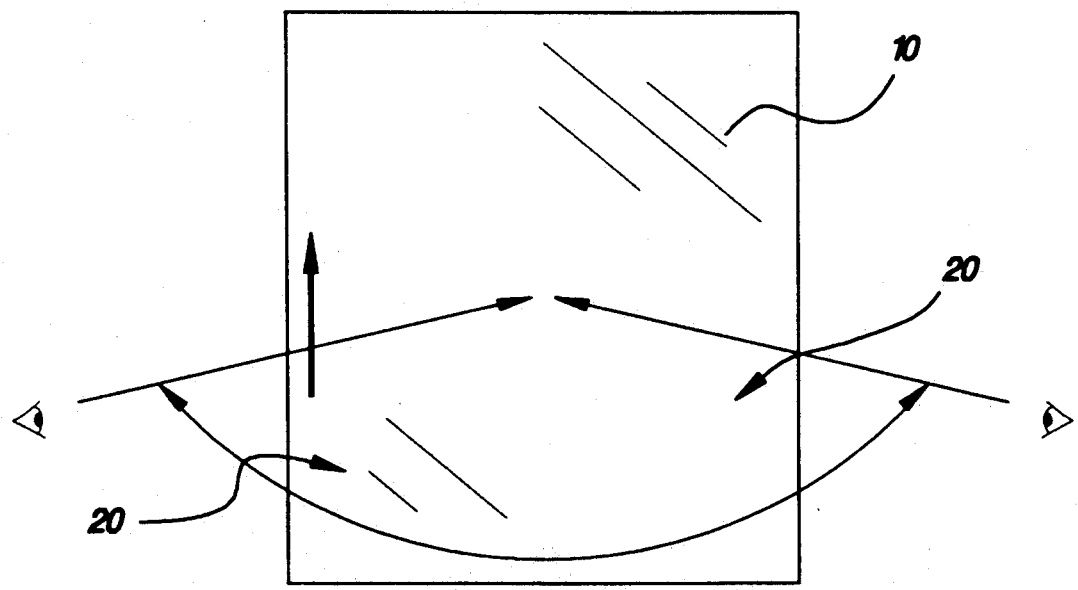
FIG. 2 is a plan view of the device shown in FIG. 1.

In accordance with the invention, a polarizer 15 is associated with the incident surface of the device 10 next to the substrate 11. By convention, the polarization direction of light passed by the polarizer is denoted by an arrow. The addition of the polarizer 15 has the effect of eliminating haze for all angles of view in a plane orthogonal to the polarization direction of the light passed by the polarizer. In FIGS. 1 and 2, the device is oriented so that the polarization direction is vertical. In this orientation, the plane of haze-free viewing is horizontal, as represented by reference character 20 in FIG. 2. If the polarizer 15 is rotated 90° so that the polarization direction is horizontal, the device 10 will be haze-free in the vertical viewing plane.

Optimum haze-free performance is achieved when the light that is incident on the liquid crystal film has the desired polarization. Thus, when a single polarizer 15 is used, the polarizer is preferably located on the incident side of the device 10 as shown in FIG. 1, opposite the side from which light will be transmitted to the observer. It is also preferable that there be nothing between the polarizer 15 and the liquid crystal film 11 that would depolarize the light passing from the polarizer 15 or change the polarization to a plane other than that which is orthogonal to the plane selected for haze-free viewing. For example, Mylar is a common material used in liquid crystal cells as a substrate. Since Mylar is birefringent, it will to some extent depolarize light passing through it. If a Mylar sheet is placed between the incident polarizer 15 and the liquid crystal film 11, it will diminish the effect of the polarizer and reduce or eliminate the haze-free effect. Thus, at least the substrate 11 on the incident side of the device 10 should be glass or other non-polarizing, non-birefringent material.

Figure 3:
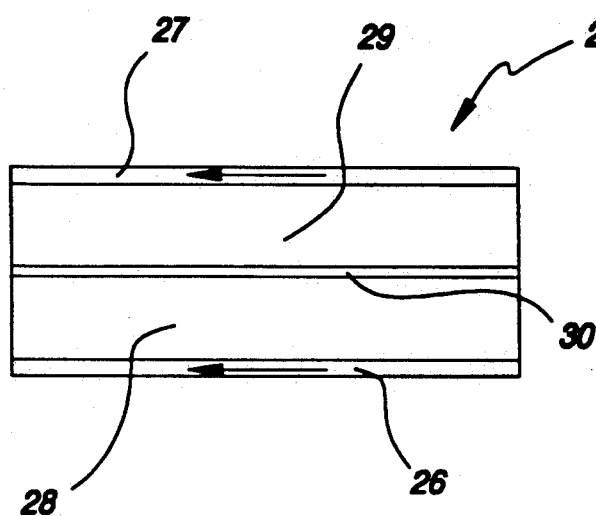
FIG. 3 is a diagrammatic edge elevation of another embodiment of the invention.

If light is incident on both sides of the device 10, parallel polarizers can be applied to both sides. The electrically switchable device 25 shown in FIG. 3 employs two polarizers 26, 27. The two polarizers are disposed on opposite surfaces of the device with the substrates 28, 29 and liquid crystal film 30 interposed between them.

Figure 4:
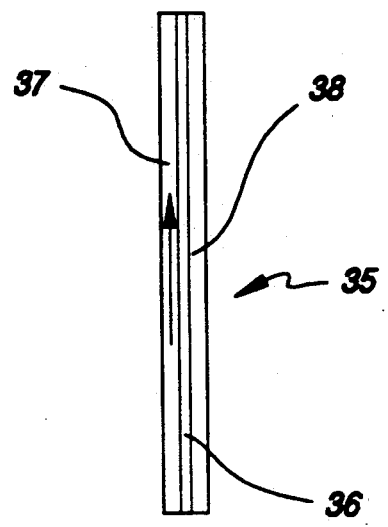
FIG. 4 is a diagrammatic edge elevation of still another embodiment of the invention.

FIG. 4 shows a device 35 in which the liquid crystal film 36 is sandwiched directly between a polarizer 37 and substrate 38, such as a glass plate, Mylar film or the like. By using a polarizer as one or both of the substrates between which the liquid crystal film is sandwiched, the thickness and cost of the device is reduced. This also eliminates the need to select non-birefringent, non-polarizing materials for the substrate sheet that contains the liquid crystal film.

Table I shows normalized transmission measurements through a liquid crystal-isotropic polymer film using an unpolarized HeNe laser. The film was immersed in a glycerol bath to minimize front and back surface reflection. The measurements were taken through the film from 0°, i.e., normal to the surface, to 70° from the normal in the plane orthogonal to the polarization direction of light passed by a polarizer. The third and fourth columns show transmission values when the polarizer is disposed on the incident surface and then the transmitting surface respectively. The second column shows the same measurements taken through the film with no polarizer.

TABLE I

| Angle | No Polarizer | Incident Surface | Transmitting Surface |
|-------|--------------|------------------|----------------------|
| 0     | 1.00         | 1.00             | 1.00                 |
| 10    | 0.94         | 1.12             | 0.89                 |
| 20    | 0.82         | 1.16             | 0.78                 |
| 30    | 0.60         | 0.93             | 0.81                 |
| 40    | 0.44         | 0.81             | 0.70                 |
| 50    | 0.30         | 0.67             | 0.57                 |
| 60    | 0.18         | 0.43             | 0.41                 |
| 70    | 0.07         | 0.18             | 0.14                 |

It can be seen that the addition of a polarizer on the incident surface significantly increases the transmission, i.e., reduces haze, at oblique angles from the normal in the plane orthogonal to the polarization direction of light passed by the polarizer. The effect is also seen when the polarizer is disposed on the transmitting surface between the liquid crystal material and the observer although the effect is not as pronounced.

Figure 5:
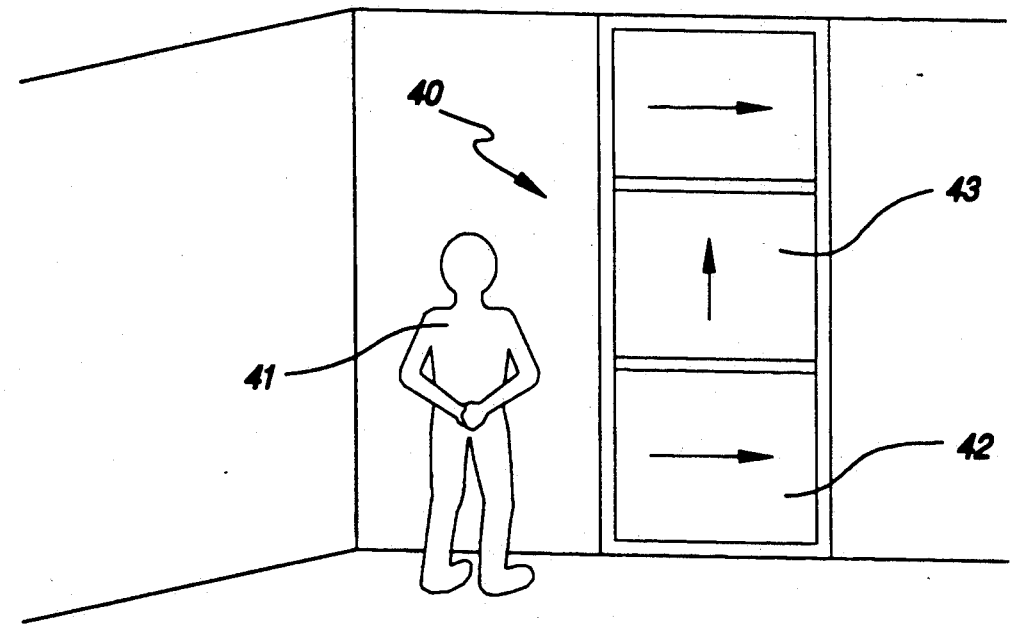
FIG. 5 is a diagrammatic perspective view illustrating one application of the invention.

Some direct view devices, such as windows, etc., may have different optimum viewing planes depending upon the angle of view. For example, FIG. 5 shows a floor to ceiling window 40 that might be installed in a house or office building. At the lower portion of the window 40 where the viewing angle will be primarily vertical relative to an observer 41, the polarizer 42 will pass the horizontal polarization of light, thereby providing a haze-free view to the observer looking through this portion of the window. In the middle of the window 40 where the viewing will be primarily in the horizontal plane, the polarizer 43 will pass the vertical polarization of light. The top portion of the window 40 again incorporates a horizontal polarizer in order to provide haze-free viewing in a vertical plane.

The addition of polarizers will reduce the overall transmission of light through the shutter by as much as 60%. However, complete polarization of light may not required for an acceptable haze-free effect. To minimize the transmission decrease caused by the addition of the polarizers, the magnitude of polarization induced by the polarizers can be decreased, thereby increasing the amount of light transmitted through the device.

Devices according to the invention will also appear opaque if the direction of the polarizer is crossed with that of polarizing sunglasses worn by an individual. Since complete polarization of light may not be required for acceptable haze-free effect, this problem can also be minimized by decreasing the magnitude of polarization induced by the polarizer thereby decreasing the level of opacity seen through cross polarizing sunglasses.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A light modulating device comprising:
   a) a film formed of a birefringent liquid crystal interspersed as spherical or randomly distorted droplets in isotropic polymer, and
   b) a polarizer which is effective to absorb one direction of polarization and thereby provide haze-free viewing through the material at all angles in a plane orthogonal to the direction of polarization passed by the polarizer.

2. A light modulating device as claimed in claim 1, wherein said device has an incident surface and a transmitting surface and said polarizer is disposed on said incident surface.

3. A light modulating device as claimed in claim 1 including a second polarizer having a polarization direction parallel to that of said first mentioned polarizer, said film being interposed between said polarizers.

4. In a light modulating device including a light modulating material formed of a birefringent liquid crystal interspersed as spherical or randomly distorted droplets in isotropic polymer having matched indices of refraction and electrodes for establishing a field through said material, the improvement comprising a polarizer which is effective to absorb one direction of polarization of light and thereby produce haze-free viewing at all angles in a plane of view orthogonal to the direction of polarization passed by the polarizer.

5. The improvement according to claim 4, wherein said light modulating device has an incident surface and a transmitting surface and said polarizer is disposed on said incident surface.

6. The improvement according to claim 4 further comprising a second polarizer having a polarization direction parallel to that of said first mentioned polarizer, said film being interposed between said polarizers.

7. In a light modulating liquid crystal device including a birefringent liquid crystal interspersed as spherical or randomly distorted droplets in isotropic polymer, wherein the ordinary index of refraction of the liquid crystal is matched to the index of refraction of the polymer, said device having an incident surface and a transmitting surface, the improvement comprising a polarizer disposed at said incident surface to provide haze-free viewing at all angles in a plane of view orthogonal to the direction of polarization of light passed by said polarizer.

8. A method of providing haze-free viewing at all angles in a selected plane of view from a light modulating material formed of a birefringent liquid crystal interspersed as spherical or randomly distorted droplets in isotropic polymer, comprising disposing a polarizer which is effective to absorb one direction of polarization adjacent a surface of said material and arranging said polarizer so that said direction of polarization is orthogonal to the plain of view selected to be haze-free.

9. The method according to claim 8 further comprising disposing said polarizer adjacent an incident surface of said material.

10. The method according to claim 9 further comprising disposing a second polarizer effective to absorb one polarization direction on an a surface of said material opposite said first mentioned polarizer and arranging said second polarizer to be parallel to said first mentioned polarizer.

* * * * *

UNITED STATES PATENT AND TRADEMARK OFFICE
CERTIFICATE OF CORRECTION

PATENT NO : 5,264,950
DATED : November 23, 1993
INVENTOR(S) : John L. West and J. Craig Carrell It is certified that error appears in the above-identified patent and that said Letters Patent is hereby corrected as shown below:

column 1, line 7: insert the following:

---The United States government has a paid-up license in this invention and may have the right in limited circumstances to require the patent owner to license others on reasonable terms as provided for by the terms of Grant DMR89-20147, awarded by the National Science Federation.---

Signed and Sealed this

Fifth Day of January, 1999

Attest:

Attesting Officer

*Acting Commissioner of Patents and Trademarks*